US011892338B2

(12) United States Patent
Greenberg (10) Patent No.: US 11,892,338 B2
(45) Date of Patent: Feb. 6, 2024

(54) FOUR-DIMENSION (4D) SCALE FOR DISTRIBUTION AND WAREHOUSE MANAGEMENT, AND ASSOCIATED METHODS

(71) Applicant: Software Developers LLC, Lakewood, NJ (US)

(72) Inventor: Jeremy Greenberg, Lakewood, NJ (US)

(73) Assignee: SELLERCLOUD, LLC, Wilmington, DE (US)

( * ) Notice: Subject to any disclaimer, the term of this patent is extended or adjusted under 35 U.S.C. 154(b) by 356 days.

(21) Appl. No.: 17/329,786

(22) Filed: May 25, 2021

(65) Prior Publication Data

US 2021/0396570 A1 Dec. 23, 2021

Related U.S. Application Data

(60) Provisional application No. 63/040,331, filed on Jun. 17, 2020.

(51) Int. Cl.
*G01G 19/00* (2006.01)
*G01G 23/37* (2006.01)
(Continued)

(52) U.S. Cl.
CPC .......... *G01G 19/005* (2013.01); *G01B 11/02* (2013.01); *G01B 17/00* (2013.01); *G01G 23/3707* (2013.01)

(58) Field of Classification Search
CPC ...... G01G 19/005; G01B 11/02; G01B 17/00; G01B 5/0004; G01B 5/0021; G01B 21/02; G01C 23/3707
(Continued)

(56) References Cited

U.S. PATENT DOCUMENTS 5,331,118 A * 7/1994 Jensen .................. G01B 11/00
702/170
9,779,546 B2 * 10/2017 Hunt ....................... G06T 17/20
(Continued)

OTHER PUBLICATIONS

CubiScan 100, Full Specification of Applications/Benefits, accessed on Jul. 12, 2021 at https://www.barcodesinc.com/cubiscan/100.htm.
(Continued)

*Primary Examiner* — Jacques M Saint Surin
(74) *Attorney, Agent, or Firm* — Mark Malek; Widerman Malek, PL (57) ABSTRACT

The package dimensioning device is configured for ascertaining measurements of cuboidal and boxed items to provide data to computer-implemented package management processes. The device has a base and a vertical support member. The base is configured to receive a package thereon and includes a weight sensor. There are multiple space-apart contactless sensors including a top sensor carried by the vertical support member, and side sensors positioned adjacent sides of the base which output dimensional data signals related to a height, length and width of the package. A control unit is communicatively coupled to the weight sensor and multiple spaced apart sensors and configured to calculate weight, height, length and width measurements of the package based upon the weight data signal and dimensional data signals. A communication unit is coupled to the control unit and configured to output the weight, height, length and width measurements to a computer network resource for access and use by the computer-implemented package management processes.

20 Claims, 4 Drawing Sheets

(51) Int. Cl.
    *G01B 17/00*    (2006.01)
    *G01B 11/02*    (2006.01)
(58) Field of Classification Search
    USPC .......................................................... 177/1
    See application file for complete search history.

(56) References Cited

U.S. PATENT DOCUMENTS

| | | | | |
|---|---|---|---|---|
| 10,148,918 B1* | 12/2018 | Seiger | ................... | H04N 23/56 |
| 10,311,634 B2* | 6/2019 | Houghton | ............... | G06T 17/10 |
| 10,466,356 B2* | 11/2019 | Rastogi | ................. | G01S 7/4808 |
| 11,216,774 B2* | 1/2022 | Powers | ............ | G06Q 10/08345 |

OTHER PUBLICATIONS

Walz, Walz SPS-MT—Static Package Scanner Dimensioning & Weighing System, accessed on Jul. 12, 2021 at https://walzeq.com/products/mailing/shipping-solutions/dimensional-weighing/sps-mt/#gsc.tab=0.

* cited by examiner

FOUR-DIMENSION (4D) SCALE FOR DISTRIBUTION AND WAREHOUSE MANAGEMENT, AND ASSOCIATED METHODS

RELATED APPLICATIONS

This application claims priority under 35 U.S.C. § 119(e) of U.S. Provisional Patent Application Ser. No. 63/040,311 filed on Jun. 17, 2020 and titled FOUR-DIMENSION (4D) SCALE FOR DISTRIBUTION AND WAREHOUSE MANAGEMENT, AND ASSOCIATED METHODS. The content of this application is incorporated herein by reference.

FIELD OF THE INVENTION

The present invention relates to systems and methods for dimensional measurements and weight of objects and, more specifically, to a device and method for ascertaining four-dimensional measurements of cuboidal and boxed items to provide data to various computerized shipping management processes via a network.

BACKGROUND OF THE INVENTION

Distribution and warehousing operations include logistics, shipping and postmarking systems, and may include the use of a parcel sizing device for the automatic determination of the three dimensions of a parcel, which dimensions are used to determine the shipping charge or the postage amount for the parcel.

Determining the amount of parcel postage for a shipment depends on several parameters including the size and weight of the parcel. The weight may either be entered manually with an external scale or be sent automatically when the scale is connected to the automated system. The dimensions of the parcel can be determined manually or automatically by a sender with a sizing device.

U.S. Pat. No. 5,841,541 describes a method and apparatus for measuring the three dimensions of a parcel. The parcel is placed in the corner of a field of measurement upon a flat surface and against two adjacent walls. At the base of each wall, and along the angle where the adjacent walls meet, is a calibrated reflective strip. The calibration marks on each of the reflective strips are of known size and spacing. Two mobile sensors are activated for reading the number of visible calibrated marks and transmitting this data to a processor which calculates the length, width, and height of the parcel by subtracting the observed visible calibration marks from the number of possible calibration marks. The three dimensions (length, width, height) and eventually the weight can then be displayed and/or transmitted to a parcel processing system.

U.S. Pat. No. 5,422,861 is directed to a method and apparatus for measuring the dimensions and determining the three-dimensional, spatial volume of objects. An object detection system is used to detect proper placement of an object to be measured, and waveguides are employed as standoffs and received wave isolators for reflected-wave sensors.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a dimensioning device for use with computer-implemented package and shipping management processes or warehouse management capabilities. The device and method are for ascertaining four-dimensional measurements of cuboidal and boxed items to provide data to computerized package management processes.

Advantages and features of an embodiment of the present invention may be provided by a package dimensioning device configured for ascertaining measurements of cuboidal and boxed items to provide data to computer-implemented package management processes. The device has a frame including a base and a vertical support member extending vertically from the base, the base being configured to receive a package thereon and comprises a weight sensor configured to output a weight data signal related to a weight of the package. There are multiple space-apart contactless sensors including a top sensor carried by the vertical support member, and side sensors positioned adjacent sides of the base, the top sensor and the side sensors being configured to output dimensional data signals related to a height, length and width of the package. A control unit is communicatively coupled to the weight sensor and multiple spaced apart sensors and configured to calculate weight, height, length and width measurements of the package based upon the weight data signal and dimensional data signals. A communication unit is coupled to the control unit and configured to output the weight, height, length and width measurements to a computer network resource for access and use by the computer-implemented package management processes.

In various embodiments, the base and weight sensor may define a scale.

In various embodiments, a display mount is coupled to the vertical support member, and a display carried by the display mount and configured to display the weight, height, length and width measurements to an operator.

In various embodiments, the computer network resource may be a Uniform Resource Locator (URL) configured to publish the weight, height, length and width measurements so that the computer-implemented package management processes can access and use the weight, height, length and width measurements.

In various embodiments, the communication unit may be a wireless communication interface.

In various embodiments, the control unit may be configured to be selected to operate in one of metric and imperial units of measure.

In various embodiments, the contactless sensors comprise at least one of laser sensors, optical sensors, light sensors and ultrasound sensors.

Another embodiment is directed to a package dimensioning device having a frame including a base and a vertical support member extending vertically from the base, the base being configured to receive a package thereon and comprises a weight sensor configured to output a weight data signal related to a weight of the package. There are multiple space-apart contactless sensors including a top sensor carried by the vertical support member, and side sensors positioned adjacent sides of the base, the top sensor and the side sensors being configured to output dimensional data signals related to a height, length and width of the package. A control unit is communicatively coupled to the weight sensor and multiple spaced apart sensors and configured to calculate weight, height, length and width measurements of the package based upon the weight data signal and dimensional data signals. A display is coupled to the control unit, carried by the frame, and configured to display the weight, height, length and width measurements to an operator. A wireless communication unit is coupled to the control unit and configured to output the weight, height, length and width measurements to a computer network resource for access and use by computer-implemented package management processes.

In various embodiments, the base and weight sensor define a scale.

In various embodiments, the computer network resource comprises a Uniform Resource Locator (URL) configured to publish the weight, height, length and width measurements so that the computer-implemented package management processes can access and use the weight, height, length and width measurements.

In various embodiments, at least one of the computer-implemented package management processes is realized by a mobile warehouse management system and a website configured to pull the weight, height, length and width measurements from the URL.

In various embodiments, the control unit is configured to be selected to operate in one of metric and imperial units of measure.

In various embodiments, the contactless sensors comprise at least one of laser sensors, optical sensors, light sensors and ultrasound sensors.

Another embodiment is directed to a method for ascertaining measurements of cuboidal and boxed items to provide data to computer-implemented package management processes. The method includes: providing a base, including a weight sensor, to receive a package thereon and configured to output a weight data signal related to a weight of the package; providing multiple space-apart contactless sensors including a top sensor positioned above the base, and side sensors positioned adjacent sides of the base, the top sensor and the side sensors being configured to output dimensional data signals related to a height, length and width of the package; calculating, via a control unit coupled to the weight sensor and multiple space-apart contactless sensors, weight, height, length and width measurements of the package based upon the weight data signal and dimensional data signals; and wirelessly communicating the weight, height, length and width measurements to a computer network resource for access and use by the computer-implemented package management processes.

In various embodiments, the method includes coupling a display mount to the vertical support member, and positioning a display on the display mount and configured to display the weight, height, length and width measurements to an operator.

In various embodiments, the computer network resource comprises a Uniform Resource Locator (URL) configured to publish the weight, height, length and width measurements so that the computer-implemented package management processes can access and use the weight, height, length and width measurements.

In various embodiments, at least one of the computer-implemented package management processes is realized by a mobile warehouse management system and a website configured to pull the weight, height, length and width measurements from the URL.

In various embodiments, the control unit is configured to be selected to operate in one of metric and imperial units of measure.

In various embodiments, the contactless sensors comprise laser sensors, optical sensors, light sensors and/or ultrasound sensors.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

The present system and method may use wireless communications. Generally, depending on the type of wireless communication system, a wireless communication device or mobile device, such as a smartphone, cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel or channels. For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

Mobile devices can be portable handsets, smartphones, or personal digital assistants, although they may be implemented in other forms. For example, mobile devices can be tablet computers, such as iPads, or other computing devices configured for communication through a mobile wireless communication network and/or other types of wireless communication links. Program applications, including the present warehouse management and shipping application, can be configured to execute on many different types of mobile devices. For example, a mobile device application can be written to execute on a Windows Mobile based mobile device, Android, iPhone, Java Mobile, or Blackberry based mobile device, for example.

An embodiment of the invention, as shown and described by the various figures and accompanying text, provides a dimensioning device for use with computer-implemented package and shipping management processes or warehouse management capabilities. The device and method are for ascertaining four-dimensional measurements of cuboidal and boxed items to provide data to computerized package management processes.

This approach addresses a key problem of how to get dimensions for a shipping order loaded into the system without requiring a user to input the data manually. As discussed above, typically a package is measured in three dimensions, width, length, and height and may also be measured by the weight. With a command (e.g. activation from an application running on a handheld or mounted device) these four values may be measured and read into the system (and web application) for use in preparing a package to be shipped.

Similar to how network printers may be configured for use in an application, there is an option to configure this network dimensioning device to read these dimension values. The dimensioning device may have a wired or wireless communication connection with the computer and/or network running the package and shipping management software, e.g. the device may be Wi-Fi enabled.

Figure 1:
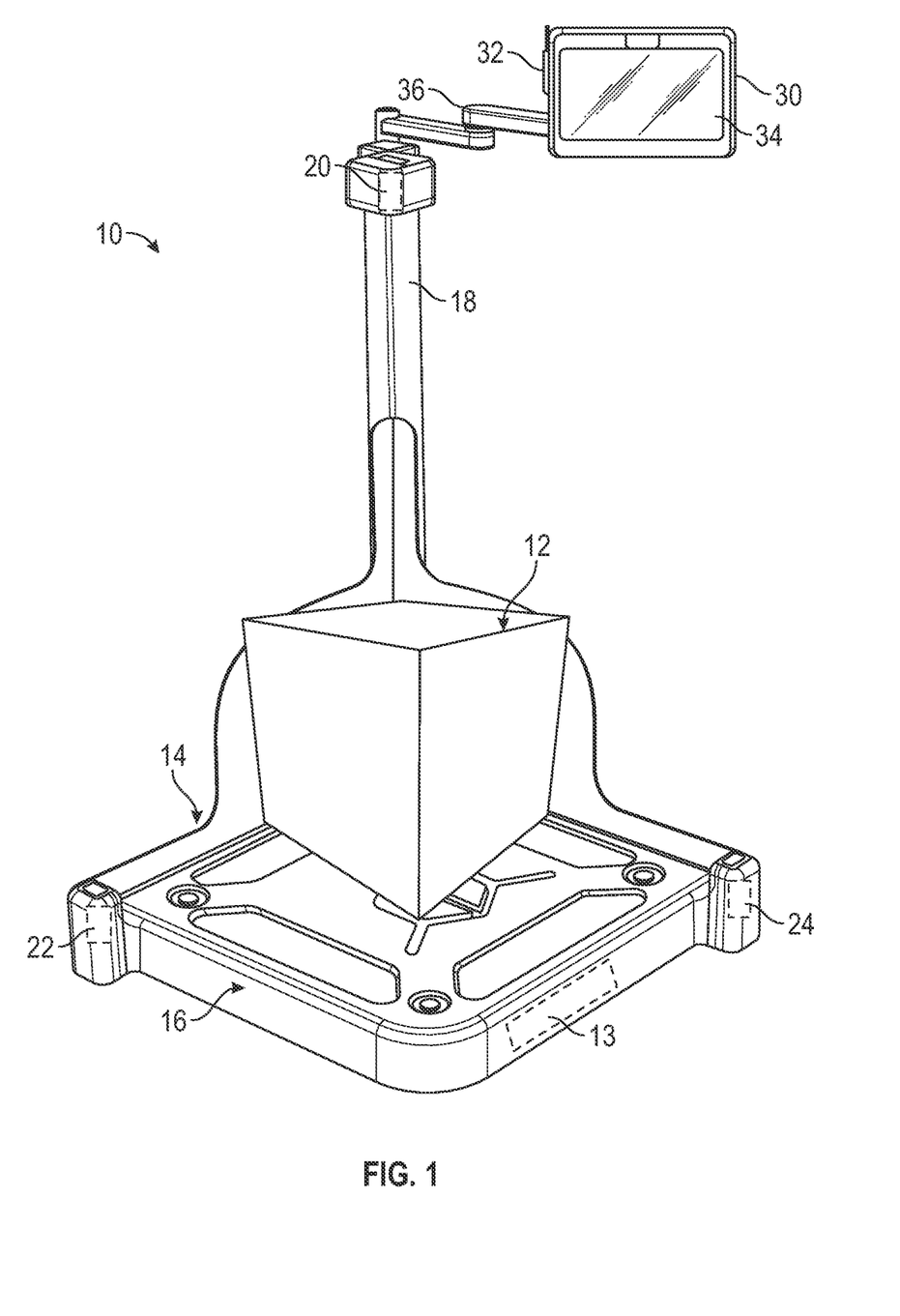
FIG. 1 is a front perspective view of an embodiment of a dimensioning device in accordance with features of the present invention.
Figure 2:
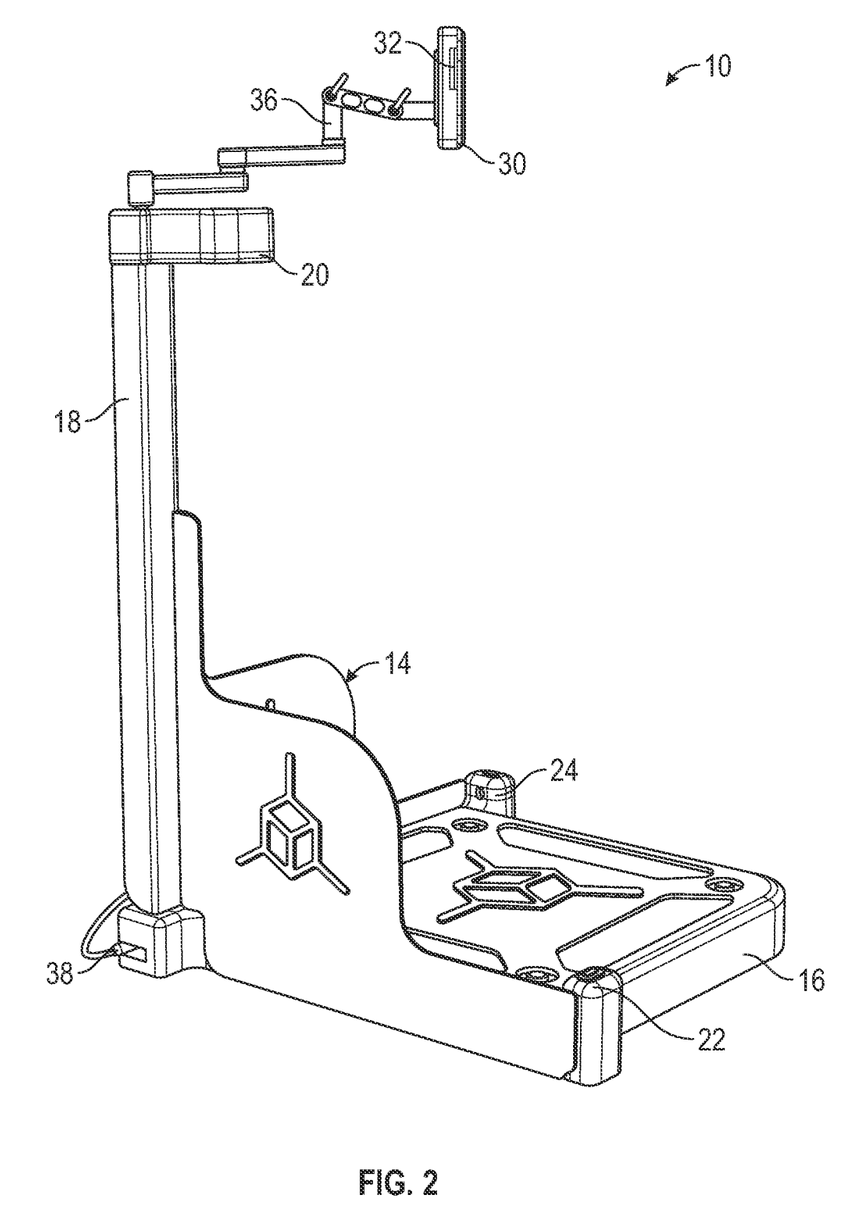
FIG. 2 is a side perspective view of the dimensioning device of FIG. 1.

Referring to FIGS. 1 and 2, an example embodiment of the present invention will be described. A package dimensioning device 10 is configured for ascertaining measurements of cuboidal and boxed items (e.g., package 12) to provide data to computer-implemented package management processes, e.g., order processing, marketplace listings, shipping processing and/or Warehouse Management Systems. While the description herein discusses the use of the device 10 in the context of shipping, it can also be used to gather information about a package for the purpose of listing it for sale on marketplaces, e.g., Amazon. This information would be collected at the time it is first received into a warehouse.

Order processing is the process or workflow associated with the picking, packing and delivery of packaged items to a shipping carrier and is a key element of order fulfillment. Order processing operations or facilities are commonly called "distribution centers" or "DC's". There are wide variances in the level of automation associating to the "pick-pack-and-ship" process, ranging from completely manual and paper-driven to highly automated and completely mechanized. A computer system overseeing these processes is generally referred to as a Warehouse Management System or "WMS".

WMS is a software application designed to support and optimize warehouse functionality and distribution center management. These systems facilitate management in using simplified automatic technologies useful in daily activities like planning, organizing, staffing, directing, warehouse keeping and controlling the utilization of available resources, to move and store materials inside, around and outside of a warehouse, while supporting staff in the performance of material movement and storage in and around a warehouse, without causing any large scale disruption to business resources.

The package dimensioning device 10 has a frame 14 including a base 16 and a vertical support member 18 extending vertically from the base. The base 16 is configured to receive the package 12 thereon. The base 16 includes a weight sensor 13 configured to output a weight data signal related to a weight of the package. The base 16 and weight sensor 13 of the package dimensioning device 10 act as a scale, weighing the package (e.g. up to 100 lbs.).

There are multiple space-apart contactless sensors including a top sensor 20 carried by the vertical support member 18, and side sensors 22, 24 positioned adjacent sides of the base 16. The top sensor 20 and the side sensors 22, 24 are configured to output dimensional data signals related to a height, length and width of the package 12. The sensors 20, 22, 24 may be mounted to the base 16 or carried by arms associated with the base to measure the dimensions of the box.

A control unit 30 is communicatively coupled to the weight sensor 13 and multiple spaced apart sensors 20, 22, 24 and configured to calculate weight, height, length and width measurements of the package 12 based upon the weight data signal and dimensional data signals. The control unit 30 may be implemented by hardware, software and/or firmware to provide the functionality described herein.

A communication unit 32 is coupled to the control unit 30 and configured to output the weight, height, length and width measurements to a computer network resource for access and use by the computer-implemented package management processes. In various embodiments, the communication unit may be a wireless communication interface, e.g., WiFi, Bluetooth, or any other compatible wireless communication protocol.

In various embodiments, the computer network resource may be a Uniform Resource Locator (URL) configured to publish the weight, height, length and width measurements so that the computer-implemented package management processes can access and use the weight, height, length and width measurements. The computer network resource may also be referred to as a shared resource, or network share, and is a computer resource made available from one host to other hosts on a computer network. It is a device or piece of information on a computer that can be remotely accessed from another computer transparently as if it were a resource in the local machine.

A display 34 may be carried by a display mount 36 and is configured to display the weight, height, length and width measurements to an operator. The display may be a touch-screen display, and may operate as a user interface for the package dimensioning device 10. The display mount 36 may be an articulated arm, as illustrated, or other type of display holder. The display 34, control unit 30 and communication unit 32 may be integrated as a single component (as illustrated) or be separately located within the package dimensioning device 10 while being communicatively coupled together via wired or wireless channels. A power supply interface 38 may be carried by the frame 14 and may provide for plug-in or battery power as would be appreciated by those skilled in the art.

Packages are handled and shipped by various shippers including United Parcel Service, Federal Express, USPS, DHL and many other smaller courier and delivery services. Typically, the charges by the carriers to their customers are based on the so-called "dim-weight factor" or "dimensional weight factor" (DWF) of the article being shipped. The DWF is an industry dimension calculated as the length times width times height in inches divided by a standard agency or association-recognized divisor or conversion factor, commonly 166 (L×W×H÷166). The "166" divisor or conversion factor has been recognized and adopted by the International Air Transport Association (I.A.T.A). Even if an object or package is of irregular configuration, the dim weight, using the longest measurement each of length, width, and height, may still be utilized for billing purposes. The volume computed by multiplication of object length times width times height may hereinafter be termed the "cubic volume," "spatial volume," or simply the "cube" of the object.

Accordingly, the scale defined at the base 12 of the device 10 measures the weight while the multiple sensors 20, 22, 24 provide data signals that are used in geometrical calculations internally by the dimensioning device or by the system to provide the length, width and height measurements of the package or box. The four measurements may be transmitted simultaneously to the system or to a handheld device. Also included is the functionality on the scale for tare weight, to basically rest the scale to zero.

The outputs from the device 10 are combined and may be displayed on a monitor, i.e., so they are visible to an operator on the display 34 (e.g. an LCD display of the control unit 30) using a user interface (e.g. XAML UI). Other devices, such as a handheld or mobile device, can also connect to the dimensioning device 10 via wireless or wired connections (e.g. via WiFi) and there may also be a wired or wireless connection (e.g. a USB cable connection) to transmit the dimensions to the host computer or network.

Figure 3:
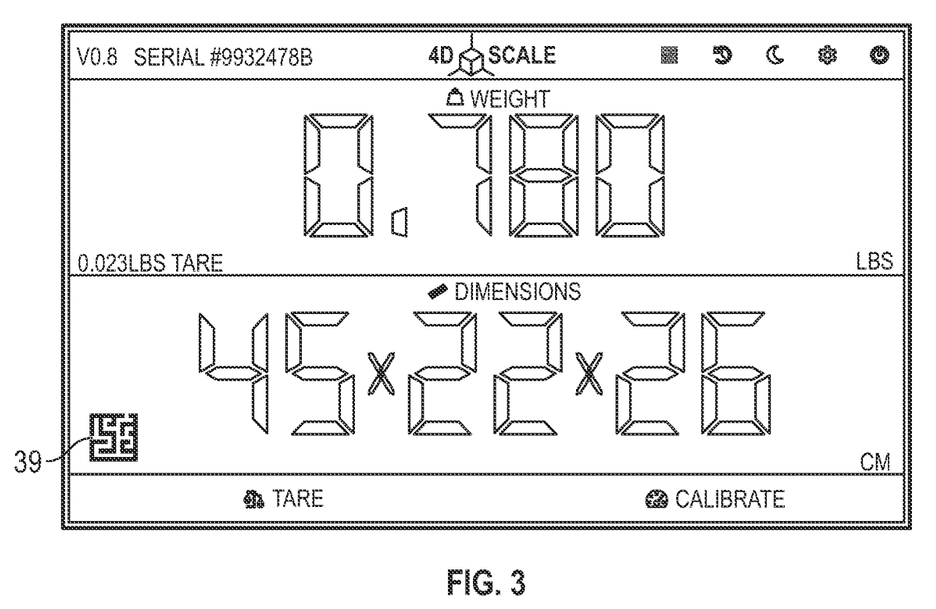
FIG. 3 is an illustration of an example of the display, of the dimensioning device of FIG. 1, showing the weight, height, length and width measurements of a package.

FIG. 3 is an illustration of an example of the display 34 of the dimensioning device 10 and showing the weight, height, length and width measurements of a package. A scannable code may be included on this user interface. For example, a QR code 39 may be displayed on the display 34, and upon scanning with a mobile device, it opens a browser with the dimensions displayed and it can be shared with other apps on the mobile device, e.g., emailing a link etc.

Figure 4A:
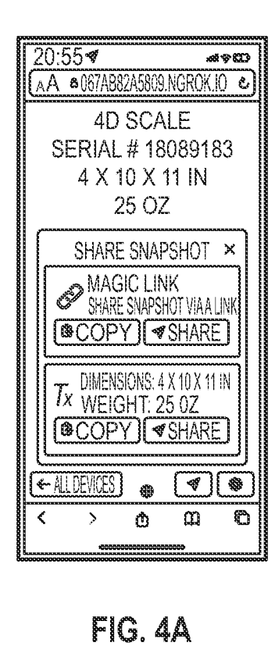
FIGS. 4A-4C are illustrations of examples of a mobile interface when a user views the weight, height, length and width measurements from the dimensioning device of FIG. 1 on their mobile device.
Figure 4B:
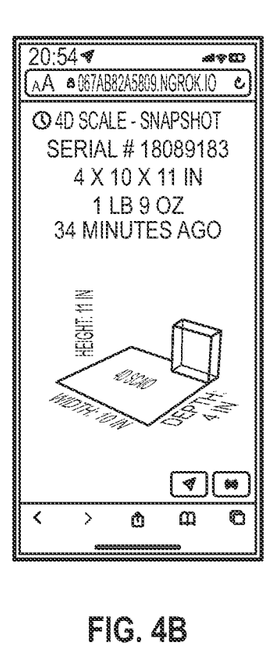
Figure 4C:
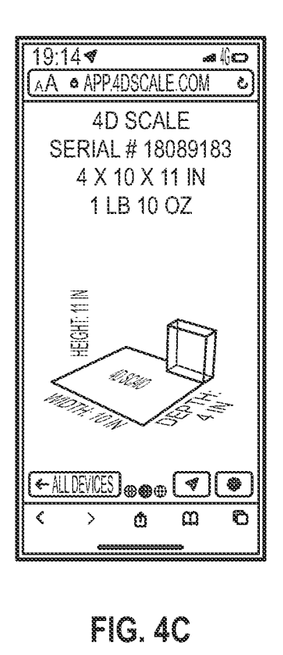
Figure 5:
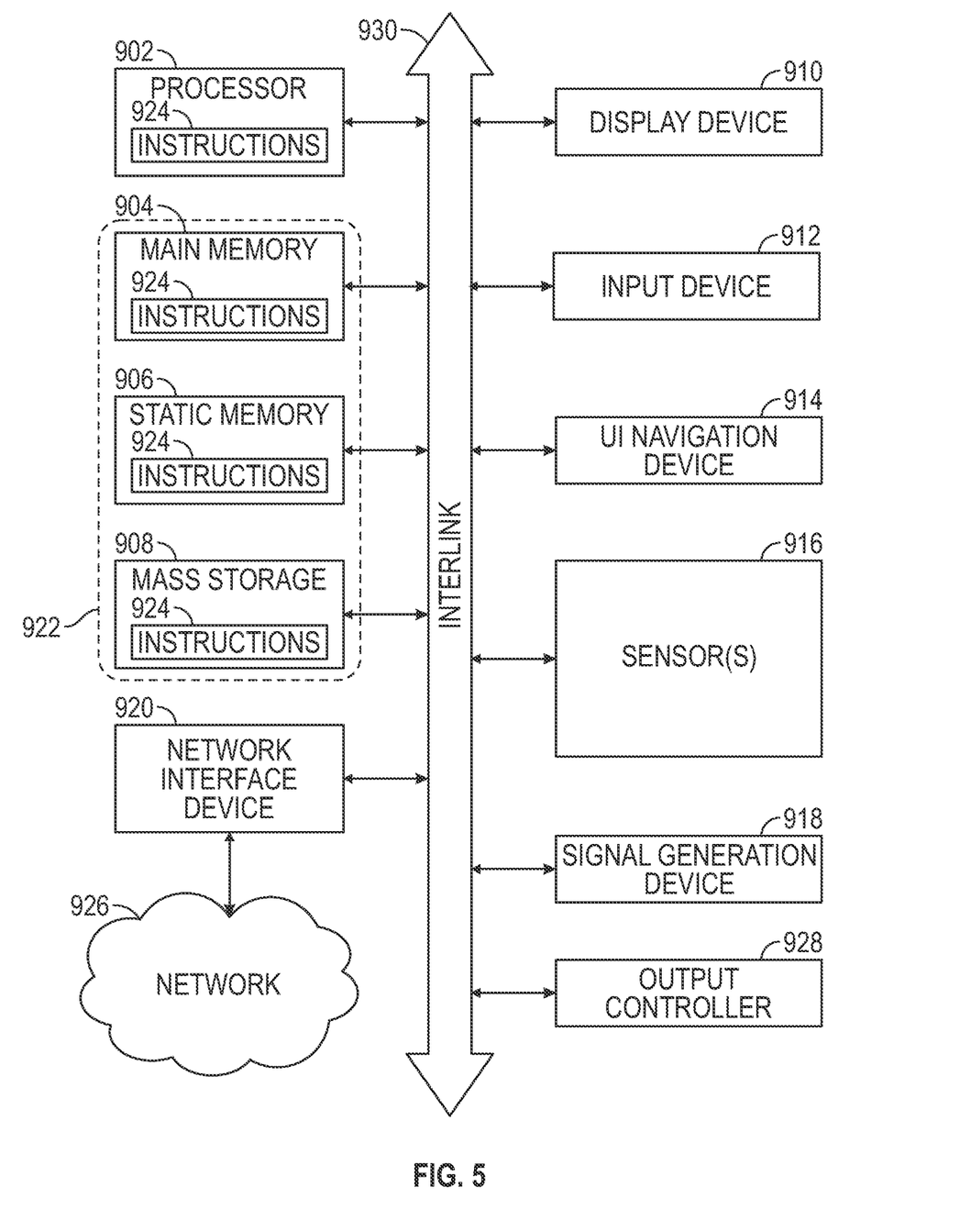
FIG. 5 illustrates a block diagram of an exemplary computer device that may control the warehouse/shipping capabilities and/or web application for use in connection with the dimensioning device of FIG. 1.

From the browser, the user can see which mobile devices are connected to the dimensioning device 10 and may change settings such as whether it displays the weight in imperial or metric. FIGS. 4A-4C are illustrations of examples of a mobile interface when a user views the weight, height, length and width measurements from the dimensioning device 10 on their mobile device, e.g. after scanning the QR code 39. The measurements may also be accessed using an Application Programming Interface (API).

So, the dimensions for a shipping order are loaded into the system without requiring a user to input the data manually. With a command (e.g. activation from a web application running on a handheld or mounted device) these four values are measured by the package dimensioning device 10 and then output into the warehouse/shipping system (and web application) to prepare the package 12 to be shipped. Since the dimensions are published to a network resource or URL, it can be accessed from within any web browser, and web based application. So, the information can be accessed anywhere over a network or the internet.

The contactless sensors, e.g., the top sensor 20 and side sensors 22, 24, may be laser sensors, optical sensors, light sensors and/or ultrasound sensors.

The measurements may benefit from tight control of all three calibration parameters: precision, accuracy and repeatability to provide quality data. Optical and laser sensors may be used in the embodiments, e.g., Laser Displacement, Inductive Displacement and Collimated Beam Sensors that provide high-speed and accurate measurements. The measurements may be carried out by optical sensors, using different kinds of light and thus may be contactless and maintenance free. The measurement technology may be based on laser, LED or structured light technology e.g., based on camera vision sensors.

Ultrasound technology is extremely safe, emitting no radiation (such as visible, ultraviolet, or infrared light), no audible sound, no odor, and no heat. Further, ultrasound, as used in the present invention, will not damage a package or its contents during the measurement operation. Finally, the ultrasonic sensors utilized in the present invention have no moving parts and may also be maintenance free.

Ultrasonic transducers and ultrasonic sensors are devices that generate or sense ultrasound energy. They can be divided into three broad categories: transmitters, receivers and transceivers. Transmitters convert electrical signals into ultrasound, receivers convert ultrasound into electrical signals, and transceivers can both transmit and receive ultrasound.

In a similar way to radar and sonar, ultrasonic transducers are used in systems which evaluate targets by interpreting the reflected signals. For example, by measuring the time between sending a signal and receiving an echo the distance of an object can be calculated. Passive ultrasonic sensors may, for example, be provided by microphones that detect ultrasonic noise that is present under certain conditions. The design of transducer can vary greatly depending on its use.

Ultrasound can also be used to make point-to-point distance measurements by transmitting and receiving discrete bursts of ultrasound between transducers. This technique is known as Sonomicrometry where the transit-time of the ultrasound signal is measured electronically (i.e. digitally) and converted mathematically to the distance between transducers assuming the speed of sound of the medium between the transducers is known. This method can be very precise in terms of temporal and spatial resolution because the time-of-flight measurement can be derived from tracking the same incident (received) waveform either by reference level or zero crossing. This enables the measurement resolution to far exceed the wavelength of the sound frequency generated by the transducers.

The present invention contemplates that the dimensioning device can be selected to operate in both metric and imperial units of measure for use in the USA or any other country. As such, the dimensioning device 10 may include a selection to operate in either metric or imperial units. The selection feature may be implemented by a switch or a touch screen selection, for example. As such, the control unit 30 may be configured to be selected to operate in one of metric and imperial units of measure.

FIG. 3 illustrates a block diagram of an example computer machine 900 upon which any one or more of the techniques (e.g., methods) discussed herein may perform. Examples, as described herein, may include, or may operate by, logic or several components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., wired or wirelessly networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or another sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 may constitute the machine-readable media 922. While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

Some of the illustrative aspects of the present invention may be advantageous in solving the problems herein described and other problems not discussed which are discoverable by a skilled artisan.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

It should be noted that the steps described in the method of use can be carried out in many different orders according to user preference. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

Users may download an application on their mobile phones, tablets or any other mobile computing device, and even a vehicle.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features may be recited in claims and/or disclosed in the specification, these combinations are not intended to limit the disclosure of possible implementations. In fact, many of these features may be combined in ways not specifically recited in the claims and/or disclosed in the specification. Although each dependent claim listed herein may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

As may be used herein, the terms "substantially" and "approximately" provides an industry-accepted tolerance for its corresponding term and/or relativity between items. Such an industry-accepted tolerance ranges from less than one percent to fifty percent. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

As may also be used herein, the terms "processor", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

The embodiments of the invention described herein are exemplary and numerous modifications, variations and rearrangements can be readily envisioned to achieve substantially equivalent results, all of which are intended to be embraced within the spirit and scope of the invention. Further, the purpose of any included abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus, the scope of the invention should be determined by the appended claims and their legal equivalents, and not by the examples given.

The invention claimed is:

1. A package dimensioning device configured for ascertaining measurements of cuboidal and boxed packages to provide data to computer-implemented package management processes, the device comprising:
   a frame including a base and a vertical support member extending vertically from the base, the base being configured to receive a package thereon and comprises a weight sensor configured to output a weight data signal related to a weight of the package;
   multiple spaced-apart contactless sensors including a top sensor carried by the vertical support member, and side sensors positioned adjacent sides of the base, the top sensor and the side sensors being configured to output dimensional data signals related to a height, length and width of the package;
   a control unit communicatively coupled to the weight sensor and multiple spaced apart sensors and configured to calculate weight, height, length and width measurements of the package based upon the weight data signal and dimensional data signals; and
   a communication unit coupled to the control unit and configured to output the weight, height, length and width measurements to a computer network resource for access and use by the computer-implemented package management processes.

2. The package dimensioning device of claim 1, wherein the base and weight sensor are provided by a scale.

3. The package dimensioning device of claim 2, further comprising a display mount coupled to the vertical support member, and a display carried by the display mount and configured to display the weight, height, length and width measurements.

4. The package dimensioning device of claim 1, wherein the computer network resource comprises a Uniform Resource Locator (URL) configured to publish the weight, height, length and width measurements accessible to the computer-implemented package management processes.

5. The package dimensioning device of claim 1, wherein the communication unit comprises a wireless communication interface.

6. The package dimensioning device of claim 1, wherein the control unit is operable in one of metric and imperial units of measure.

7. The package dimensioning device of claim 1, wherein the contactless sensors comprise at least one of optical sensors, light sensors and ultrasound sensors.

8. The package dimensioning device of claim 1, wherein the contactless sensors comprise laser sensors.

9. A package dimensioning device comprising:
   a frame including a base and a vertical support member extending vertically from the base, the base being configured to receive a package thereon and comprises a weight sensor configured to output a weight data signal related to a weight of the package;
   multiple space-apart contactless sensors including a top sensor carried by the vertical support member, and side sensors positioned adjacent sides of the base, the top sensor and the side sensors being configured to output dimensional data signals related to a height, length and width of the package;
   a control unit communicatively coupled to the weight sensor and multiple spaced apart sensors and configured to calculate weight, height, length and width measurements of the package based upon the weight data signal and dimensional data signals;
   a display coupled to the control unit, carried by the frame, and configured to display the weight, height, length and width measurements to an operator; and
   a wireless communication unit coupled to the control unit and configured to output the weight, height, length and width measurements to a computer network resource for access and use by computer-implemented package management processes.

10. The package dimensioning device of claim 9, wherein the base and weight sensor are provided by a scale.

11. The package dimensioning device of claim 9, wherein the computer network resource comprises a Uniform Resource Locator (URL) configured to publish the weight, height, length and width measurements to be accessible to the computer-implemented package management processes.

12. The package dimensioning device of claim 11, wherein at least one of the computer-implemented package management processes is implemented by a mobile warehouse management system and a website configured to pull the weight, height, length and width measurements from the URL.

13. The package dimensioning device of claim 9, wherein the control unit is operable in one of metric and imperial units of measure.

14. The package dimensioning device of claim 9, wherein the contactless sensors comprise at least one of laser sensors, optical sensors, light sensors and ultrasound sensors.

15. A method for ascertaining measurements of cuboidal and boxed items to provide data to computer-implemented package management processes, the method comprising:

providing a base, including a weight sensor, to receive a package thereon and configured to output a weight data signal related to a weight of the package;

providing multiple space-apart contactless sensors including a top sensor positioned above the base, and side sensors positioned adjacent sides of the base, the top sensor and the side sensors being configured to output dimensional data signals related to a height, length and width of the package;

calculating, via a control unit coupled to the weight sensor and multiple space-apart contactless sensors, weight, height, length and width measurements of the package based upon the weight data signal and dimensional data signals; and wirelessly communicating the weight, height, length and width measurements to a computer network resource for access and use by the computer-implemented package management processes.

16. The method of claim 15, further comprising coupling a display mount to the vertical support member, and positioning a display on the display mount and configured to display the weight, height, length and width measurements to an operator.

17. The method of claim 15, wherein the computer network resource comprises a Uniform Resource Locator (URL) configured to publish the weight, height, length and width measurements to be accessible to the computer-implemented package management processes.

18. The method of claim 17, wherein at least one of the computer-implemented package management processes is implemented by a mobile warehouse management system and a website configured to pull the weight, height, length and width measurements from the URL.

19. The method of claim 15, wherein the control unit is operable in one of metric and imperial units of measure.

20. The method of claim 15, wherein the contactless sensors comprise at least one of laser sensors, optical sensors, light sensors and ultrasound sensors.

* * * * *